United States Patent [19]

Beckstead et al.

[11] 4,328,190
[45] May 4, 1982

[54] SOLVENT EXTRACTION OF TUNGSTEN FROM AQUEOUS TUNGSTATE SOLUTIONS

[75] Inventors: Leo W. Beckstead, Arvada; Dale K. Huggins, Golden, both of Colo.

[73] Assignee: Amax Inc., Greenwich, Conn.

[21] Appl. No.: 225,906

[22] Filed: Jan. 19, 1981

[51] Int. Cl.$^3$ .............................................. C01G 41/00
[52] U.S. Cl. ............................... 423/54; 75/101 BE
[58] Field of Search ................ 423/53, 54; 75/101 BE

[56] References Cited

U.S. PATENT DOCUMENTS 3,158,438 11/1964 Kurtak .................................... 23/22
4,092,400 5/1978 Zbranek et al. ....................... 423/54
4,175,109 11/1979 Kim ....................................... 423/54

FOREIGN PATENT DOCUMENTS 684892 7/1968 South Africa ......................... 423/54
1013364 12/1965 United Kingdom .

OTHER PUBLICATIONS

Zelikman et al., "Extracting Tungsten by Trialkylamine . . . ", Tsvetnye Metally, 13 (3) (Mar. 1972) pp. 42–44.
Exxon Product Information Bulletin (1977) re: "Escaid 200".
Petrov et al., "Using Amines to Extract Tungsten . . . ", Tsvetnye Metally, V. 11-19 (1970) pp. 45–56.
Yih & Wang, Tungsten: Sources Metallurgy, Properties & Applications: (1979) pp. 104–108.

*Primary Examiner*—Herbert T. Carter
*Attorney, Agent, or Firm*—Michael A. Ciomek; Donald T. Black

[57] ABSTRACT

A process for extracting tungsten values from an aqueous phase into an organic phase, comprises
(a) providing an aqueous phase containing tungsten values dissolved therein, and having an initial pH of about 2.2 to about 4.0,
(b) providing an organic phase depleted in tungsten and containing a secondary amine or tertiary amine extractant, a modifier, and the balance a liquid hydrocarbon solvent,
(c) extracting tungsten values from said aqueous phase into said organic phase in a plurality of extraction stages operating in countercurrent fashion, and
(d) recovering the organic phase enriched in tungsten values and an aqueous raffinate having a pH of about 0.3 to about 4.5.

12 Claims, No Drawings

SOLVENT EXTRACTION OF TUNGSTEN FROM AQUEOUS TUNGSTATE SOLUTIONS

BACKGROUND OF THE INVENTION

1. Field of the Invention

The present invention relates generally to recovery of tungsten in purified form from tungsten-bearing material. More specifically the invention relates to solvent extraction processes in which tungsten values are extracted from an aqueous phase, such as a solution of sodium tungstate, into an organic phase. The tungsten values can subsequently be stripped into an ammoniacal aqueous phase for eventual recovery of an ammonium tungstate product.

Solvent extraction is customarily employed in the recovery of tungsten to separate tungsten values from contaminants accompanying the tungsten in solution in the aqueous phase. These contaminants include sodium ion and sulfate ion, and also include silica, fluorine, calcium, and magnesium. The tungsten-bearing aqueous phase is intimately mixed with an organic phase typically comprising at least one extractant for the tungsten values and one or more other liquid organic compounds. The tungsten values are extracted into the organic phase, and the mixture of organic and aqueous phases is allowed to settle so that the two phases can be recovered separately. The steps of mixing and settling can be repeated several times to improve the overall degree of extraction of tungsten values.

Several problems are commonly associated with the extraction of tungsten values from an aqueous phase into an organic phase, and the present invention effectively deals with these problems. One problem is the contamination of the organic phase with impurities from the aqueous phase. In particular, sodium ion and oxidized sulfur ions (such as sulfate and bisulfate) can transfer into the organic phase, in which case they are carried with the tungsten into the final product and contaminate that product. Accordingly, it is desirable to minimize transfer of sodium into the organic phase, and to minimize the amounts of sulfate and bisulfate which are present in the final tungsten product. These ions can be transferred by extraction or by physical entrainment of the aqueous phase in the organic phase.

Another problem encountered in solvent extraction of tungsten values is the formation of a third phase. The third phase can comprise liquid, solids, or a mixture of liquid and solid. The third phase is formed when the tungsten content extracted into the organic phase exceeds a moderate level. The third phase builds up, so that process equipment must periodically be shut down to remove it, and it represents lost extraction efficiency. This problem can be caused by the excessive transfer of impurities from the aqueous phase into the organic phase, or by the choice of constituents used in the organic phase. This drawback can require the operator to tolerate low tungsten contents in the organic phase so as to avoid formation of the third phase.

A related problem is the slow rate at which the aqueous and organic phases separate in the settling stage. Stated another way, the mixture of aqueous and organic phases fed to a settler should separate quickly into two discrete phases, but in actual practice relatively long periods of time can be necessary to separate the two phases to a satisfactory degree.

Thus, there is a need for a process for extracting tungsten values from an aqueous phase into an organic phase, wherein substantial amounts of tungsten and only minor amounts, if any, of impurities are extracted into the organic phase, and wherein a mixture of the aqueous and organic phases settles rapidly to form only two discrete phases.

2. Description of the Prior Art

U.S. Pat. No. 4,175,109 to Kim describes a solvent extraction process for tungsten in which a specific organic extractant is employed to extract tungsten from an aqueous phase having an initial pH of 2.0. The extractant comprises 6 to 10 vol. % of tri-isooctylamine, optionally including other tertiary amines, in an alkyl benzene solvent having a molecular weight of 120, 134, or 148. This patent does not disclose the effect of the pH of the aqueous feed and of the raffinate on the advantages discussed herein that are afforded by the present invention.

U.S. Pat. No. 4,092,400 to Zbranek discloses a process in which tungsten values are extracted from an aqueous phase into an organic phase which comprises an amine extractant, such as a secondary amine having substituents each 8 to 22 carbon atoms in length, and a modifier such as isodecanol, dissolved in kerosene. In the disclosed process, the pH of the aqueous phase is adjusted to 1 to 1.8, and maintained at 1 to 1.8; pH values above 1.8 are said to cause emulsion problems, substantially slower phase separation, and incomplete tungsten extraction. The patentee does not disclose or suggest the advantages applicants have discovered of maintaining the initial pH of the aqueous phase, and the pH of the aqueous raffinate, within the specific ranges disclosed and claimed herein.

U.S. Pat. No. 3,158,438 to Kurtak also discloses extracting tungsten values from an aqueous phase into an organic phase which comprises an organic amine, such as ditridecylamine, dissolved in an aromatic solvent or kerosene with a long-chain aliphatic alcohol modifier. However, use of ditridecylamine and several other amines is said to provide less than 90% extraction of tungsten into the organic phase. The aqueous phase can have a pH of below 3, such as 2.1 to 2.3, as a result of the acidification in a previous treatment step for removal of molybdenum. There is no recognition of the advantageous effects of providing both the raffinate pH and the aqueous feed pH within the specific ranges applicants have discovered.

The authors of an article in "Soviet Journal of Non-Ferrous Metals," 13 (3) (March, 1972) pp. 42–44, described a series of tests in which a pure aqueous sodium tungstate solution was extracted with an equal volume of an organic phase comprising 10 vol. % of a mixture of tertiary amines having substituents with 7 to 9 carbon atoms, and 20 vol. % octyl alcohol, dissolved in kerosene, at about 20° C. At an "equilibrium pH" of 2.5 to 4.5, over 99% of the tungsten was extracted from an aqueous solution having an initial tungsten content of 50.5 gpl $WO_3$. At an "equilibrium pH" of 3.0 to 4.2, over 97.6% of the tungsten was extracted from an aqueous solution having an initial tungsten content of 89.35 gpl $WO_3$. There is no disclosure, however, of the effect of the aqueous feed pH or the raffinate pH on such features as sodium ion or sulfate ion transfer into the organic phase, the rate of disengagement of the organic and aqueous phases, or the formation of a third solid or liquid phase. In addition, there is no recognition of the particular pH ranges disclosed and claimed herein for the aqueous feed and the aqueous raffinate to be used in an extraction system, which employs ditridecylamine as opposed to tertiary amines; it is noted that the ditridecylamine employed in the process of the present invention provides significantly superior results.

SUMMARY OF THE INVENTION

A process for extracting tungsten values from an aqueous phase into an organic phase, wherein a tungsten-depeleted organic extractant is mixed with a tungsten-enriched aqueous phase to form a tungsten-organic complex in said extractant, comprising
  (a) providing an aqueous phase containing tungsten values dissolved therein, and having an initial pH of about 2.2 to about 4.0,
  (b) providing a water-immiscible organic phase selected from the group consisting of ditridecylamine dissolved in an aliphatic solvent, and water-insoluble secondary and tertiary amines dissolved in aromatic hydrocarbons, said organic phase also containing a modifier in an amount effective to increase the solubility of the tungsten-organic complex in said organic phase, and to increase the rate of separation of the organic-aqueous mixture,
  (c) contacting said aqueous phase with said organic phase in a plurality of extraction stages, including a final extraction stage, operating in countercurrent fashion to extract tungsten values into said organic phase from said aqueous phase, and
  (d) recovering from the final extraction stage the organic phase enriched in tungsten values and an aqueous raffinate having a pH of about 3.0 to about 4.5, wherein acid is added as necessary to the final extraction stage to maintain the pH of the aqueous raffinate at about 3.0 to about 4.5.

DETAILED DESCRIPTION OF THE INVENTION

As indicated, the process of the present invention is effective to extract tungsten values from an aqueous phase, especially one contaminated with sodium ions and sulfate ions, into an organic phase, from which the tungsten values can subsequently be stripped. For purposes of this disclosure and the claims which follow, the term "sulfate" will be used to refer to both the $SO_4^{-2}$ ion and the $HSO_4^-$ ion, as both these ions can contaminate the final tungsten product and are typically found in equilibrium with each other.

Among the many advantages which distinguish the process of the present invention from previous processes, the present invention provides a high degree of tungsten extraction from the aqueous phase into the organic phase, while providing very low levels of contaminants in the organic phase. After the aqueous and organic phases are mixed together, the mixture separates rapidly, to form two discrete and clear layers. In addition, the tungsten-loaded organic phase contains so little entrained aqueous phase that the organic phase can be washed to a high degree of purity with surprisingly small quantities of wash water. Significantly, these advantages can be realized even when the process is operated to provide relatively high loadings of tungsten into the organic phase, such as about 120 gpl $WO_3$ or higher.

The aqueous tungsten-bearing phase can be produced by leaching tungstate-bearing ore or concentrates with sodium carbonate or other alkaline reagents, for instance in accordance with one of the following patent applications filed on even date herewith and assigned to the assignee of the present application: "Autoclave Soda Digestion of Scheelite Concentrates", Ser. No. 06/225,914; "Autoclave Soda Digestion of Refractory Concentrates", Ser. No. 06/225,913; "Autoclave Soda Digestion of Scheelite On-Line Feedback Control," Ser. No. 06/225,910; and "Combined Autoclave Soda Digestion of Wolframite and Scheelite," Ser. No. 06/225,905. The disclosures of these applications are hereby incorporated by reference herein.

The aqueous tungsten phase processed in accordance with the present invention can also be preliminarily treated to reduce the content dissolved therein of impurities such as compounds of silica, phosphorus, fluorine, and molybdenum. Silica, phosphorus, and fluorine impurities can be removed in accordance with the process disclosed in the application, filed on even date herewith and assigned to the assignee of the present application, entitled "Treatment of Sodium Tungstate Leach Liquor Containing Dissolved Silica, Phosphorus, and Fluorine Impurities," Ser. No. 06/225,907. Molybdenum impurities can be removed from solution in the aqueous phase in accordance with the process disclosed in the patent application, filed on even date herewith and assigned to the assignee of the present application, entitled "Separation of Trace Molybdenum from Tungstate Solutions," Ser. No. 06/225,915. The disclosures of these two patent applications are hereby incorporated by reference herein.

The aqueous phase treated according to the process of the present invention can contain tungsten in amounts ranging from about 10 gpl $WO_3$ up to about 100 gpl $WO_3$ or higher. The aqueous tungstate solution advantageously contains at least about 50 gpl $WO_3$, and more advantageously at least about 60 gpl $WO_3$; the amount of tungsten that is extracted into the organic phase and thus available for further processing generally increases with increasing tungsten concentration in the aqueous phase, and as pointed out above, the process of the present invention can advantageously be applied to form relatively high tungsten contents in the organic phase. The aqueous phase is also typically contaminated with about 35 to about 55 gpl of sodium ion, about 50 to about 80 gpl of sulfate ion, and up to about 500 ppm of other impurities such as silica, fluorine, calcium, and magnesium.

The initial pH of the aqueous tungsten-bearing phase fed to the extraction process of the present invention should be about 2.2 to about 4.0, and if necessary should be adjusted to a value within this range by suitable additions of sulfuric acid or sodium hydroxide. Operation at a pH above about 4.0 unsatisfactorily reduces the tungsten extraction into the organic phase that can be obtained, whereas operation at a pH below about 2.2 causes excessive amounts of sodium and sulfate to be transferred into the organic phase with resultant formation of secondary haze in the organic phase. To these ends, the pH of the aqueous phase is more advantageously about 2.2 to about 3.0, and yet more advantageously about 2.6.

Tungsten values can be very effectively extracted from the aqueous phase described above, employing as the organic phase a selected mixture of hydrocarbon liquids described as follows. The organic phase should contain secondary or tertiary amine in an amount effective to extract tungsten values from the aqueous phase into the organic phase. Advantageously, the secondary or tertiary amine comprises about 2 vol. % to about 20 vol. %, and more advantageously about 5 vol. % to about 15 vol. %, of the organic phase. For secondary amines, the two substituents should be two of the following in any combination: aryl, alkyl, or alkenyl. In addition, the total number of carbon atoms should be at least six or a sufficient number to impart low water solubility and high organic solubility so as to give a high distribution coefficient in the two phase organic solvent and water system employed and leave less than about 1.5 grams of amine dissolved in each liter of aqueous phase. For tertiary amines, the three substituents should preferably be three of the following in any combination: aryl, alkyl, or alkenyl. In addition the total number of carbon atoms should be at least six or a sufficient number to impart low water solubility and higher organic solubility so as to give a high distribution coefficient in the two phase organic solvent and water system employed and leave less than about 0.5 gram of amine dissolved in each liter of aqueous phase. Exemplary amines include bis-(isobutyl-3,5-dimethyl hexyl) amine, tertiary-octyl amine, tri-isooctyl amine, triamyl amine, ditridecyl amine, tris-tridecyl amine, bis-(methylbenzyl) amine, bis-decyl amine, and N-benzyl-1-(3-ethylpentyl)-4-ethyl-octyl amine. A satisfactory amine is ditridecylamine, such as a product sold by Sherex Chemical Co. under the name "Adogen 283", which contains at least about 80 vol. % ditridecylamine, about 15 vol. % tertiary amines, and 2 to 3 vol. % primary amines.

The organic phase should also contain as a modifier such as a long-chain alcohol having 6 to 15 carbon atoms; advantageously modifiers are nonanol and isodecanol. By "nonanol" is meant a saturated hydrocarbon chain nine carbon atoms long and substituted with one hydroxyl group, and optionally substituted with up to 3 methyl or ethyl groups, specifically including 2, 6, 8-trimethyl-4-nonanol. By "isodecanol" is meant one or a mixture of more than one branched-chain saturated hydrocarbons substituted with one hydroxyl group, having the generic formula $C_{10}H_{21}OH$. The modifier is added to the organic phase to promote rapid and clear separation of the aqueous and organic phases following mixing thereof. The modifier also increases the solubility of the tungsten-organic complex (formed when tungsten transfers from the aqueous phase to the organic phase) in the organic phase. Accordingly, the modifier should be present in the organic phase in an amount effective to increase the solubility of the tungsten-organic complex in the organic phase, and to decrease the entrainment of the aqueous phase in the organic phase, and vise versa, advantageously, the organic modifier should comprise about 2 vol. % to about 20 vol. %, and more advantageously about 5 vol. % to about 15 vol. %, of the organic phase.

The balance of the organic phase should comprise a solvent, comprising one or more liquid hydrocarbons, in which the organic extractant and modifier are completely soluble and from which the aqueous phase can be rapidly separated. Aromatic-type solvents should be employed when the extractant comprises a tertiary amine, while aromatic or aliphatic solvents can be employed when the extractant comprises a secondary amine. Advantageously, the components of the organic phase are completely soluble in the solvent even when the amine extractant is fully loaded with tungsten. A highly advantageous solvent comprises a mixture of liquid hydrocarbons, characterized in that it has a boiling point range of about 190° C. to about 220° C., and in that at least about 98 wt. % of it comprises a mixture of linear, saturated paraffins 10 to 13 carbon atoms in length. A highly satisfactory solvent meeting this description is "ESCAID 200"; this product typically contains about 12.7 wt. % $C_{10}H_{22}$, about 35.3 wt. % $C_{11}H_{24}$, about 43.2 wt. % $C_{12}H_{26}$, about 6.9 wt. % $C_{13}H_{28}$, about 0.2 wt. % isoparaffins, about 1.1 wt. % cycloparaffins, and about 0.6 wt. % monoaromatics. By aromatic solvents are meant solvents comprising about 10 vol. % or more of aromatic components.

Tungsten values are extracted from the aqueous phase into the organic phase, the phases having the characteristics described above, by contacting the two phases in a plurality of extraction stages operating in countercurrent fashion. From 2 to 10 extraction stages can be employed, although advantageously 2 to 6 stages and more advantageously 4 stages provide a satisfactorily high degree of tungsten extraction together with a satisfactorily low extraction of impurities.

Each extraction stage can comprise a mixing section and a settling section. The aqueous phase and the organic phase are fed from other extraction stages into the mixing section, where they are intimately mixed together under agitation which should be sufficient to provide mass transfer of tungsten values from the aqueous phase into the organic phase, but not so severe that the two phases from an emulsion or a third phase. The mixture formed in the mixing section typically flows out of that section near the top thereof and is conveyed past suitable baffling to an associated settling section in which the organic and aqueous phases are permitted to separate into two discrete layers. Baffling should promote the rapid coalescence of two phases by directing the mixture into the settling stage near the interface between the two layers. In an advantageous arrangement, the mixture flows into one end of the settler near the top thereof, and the flow is directed downward by a baffle which extends down from the top of the settler and terminates just above the organic-aqueous interface such that the mixture entering the settler disengages gently and vertical velocity gradients are minimized. The two phases are then drawn off separately.

The extraction stages are operated in conventional countercurrent fashion, i.e. such that as the organic phase proceeds from one extraction stage to the next and is progressively enriched in tungsten values, the aqueous phase with which it is mixed has a progressively higher concentration of tungsten values dissolved therein; similarly, as the aqueous phase proceeds from one extraction stage to the next and is progressively depleted of tungsten values the organic phase with which it is mixed has a successively lower tungsten content. The extraction stages are conveniently arranged in series such that the aqueous phase to be treated in accordance with the process of the present invention having an initial pH of about 2.2 to about 4.0, is fed to the mixing section of the first extraction stage, passes from the settling section of that stage through one or more additional extraction stages, and is recovered from the last extraction stage as an aqueous raffinate containing only small amounts of tungsten, typically less than about 100 ppm of $WO_3$. More advantageously, the raffinate should contain less than about 20 ppm of tungsten as $WO_3$, as this represents more complete extraction of tungsten. The organic phase depleted in tungsten is fed to the mixing section of this last extraction stage, passes from the settling section of this extraction stage through the other extraction stages countercurrent to the aqueous phase and is recovered enriched in tungsten values from the settling section of the first extraction stage (to which the aqueous phase was first fed).

The advantages of the process of the present invention are realized by operating the extraction stages under conditions such that the aqueous raffinate which is recovered has a pH of about 3.0 to about 4.5. The raffinate pH can most readily be provided in this range by adding suitable amounts of sulfuric acid into the mixing section of the extraction stage to which the tungsten-depleted organic phase is fed. As pointed out above, the raffinate is recovered from the settling section of this extraction stage. An effective amount of acid should be added to regenerate the amine component of the tungsten-depleted organic phase to the sulfate or bisulfate, and to keep tungsten values from reporting to the raffinate. More advantageously, the raffinate pH is about 3.4 to about 4.2, and yet more advantageously about 3.8.

The organic phase enriched in tungsten which is recovered from the extraction stages can contain at least about 30 gpl up to about 120 gpl $WO_3$, or more, and advantageously at least about 40 gpl and more advantageously at least about 75 gpl $WO_3$, depending on the tungsten content of the aqueous phase to be extracted. A tungsten content in the organic phase as high as about 120 gpl $WO_3$ or more can be achieved. The present invention also provides an unexpectedly high degree of extraction of tungsten values from the aqueous phase into the organic phase consistent with the other advantages of the invention. Extractions of about 99% or more, and advantageously at least about 99.9%, permit increased rates of tungsten recovery with efficient use of reagents.

When the aqueous phase fed to the extraction stages is contaminated with sodium ions, sulfate ions, and other impurities, the organic phase enriched in tungsten by the present invention nonetheless contains only minor amounts of the contaminants. For instance, washing and stripping the loaded organic can provide an aqueous strip liquor containing about 150 to about 250 gpl $WO_3$ or more, with less than about 20 ppm and more advantageously less than about 10 ppm of sodium ion, and containing less than about 10 gpl and more advantageously less than about 2 gpl of sulfate ion.

The extraction stages should be operated at a temperature which is not so low that phase disengagement in the settling sections is retarded, but not so high that a component of the organic phase is lost through evaporation. Temperatures between about 30° C. and about 55° C., and more advantageously about 40° C. to about 50° C., are effective in this regard.

The amount of organic phase to use should be sufficient to extract satisfactory quantities of tungsten values from the aqueous phase, but should not be so high that the tungsten values are unduly diluted in the organic phase. The mixing ratio (by volume) of the aqueous phase to the organic phase in the extraction stages (the "A/O" ratio) should be about 2:1 to about 1:2, and advantageously about 1:1 to realize satisfactory phase separation. The extraction stages should be operated such that the organic is the continuous phase.

The organic phase enriched in tungsten values can be washed with de-ionized water for removal of entrained solution and impurities, in one or more washing stages comprising mixer-settler units of conventional design. Washing can be carried out at an overall O/A ratio of about 5:1, although advantageously O/A ratios of 10:1 or up to about 20:1 can be employed, thereby increasing the operating efficiency of the overall operation. It should be realized that in the extraction or washing stages, the aqueous or organic phase can be recycled to provide an effective mixing ratio of about 1:1 although the overall ratio may vary from 1:1.

The washed, tungsten-enriched organic phase can then be conveyed to a stripping circuit, in which the tungsten values are stripped from the organic phase into an aqueous, ammoniacal solution. Stripping can be carried out in accordance with the process described in the application filed on even date herewith and assigned to the assignee of the present application, entitled "Ammonium Hydroxide Stripping of Tungsten from Organic Solvents," Ser. No. 06/225,903, the disclosure of which is hereby incorporated by reference herein. The organic phase, stripped of tungsten values and optionally washed for removal of entrained aqueous phase, is suitable for use as the tungsten-depleted organic phase fed to the extraction process of the present invention.

The invention will be further described in the following Example, which should be read as illustrative and not limiting.

EXAMPLE 1

Aqueous solutions of tungsten, having the composition set forth in Table 1 below, were continuously extracted in a 4-stage extraction circuit with an organic phase described in Table 1. The tungsten-loaded organic was then washed in 2 stages, and fed to a one-stage stripper. The volume ratio of organic to aqueous phases (O/A) in extraction, washing, and stripping, and the characteristics of the process streams, are given in Table 2. Stripping was carried out at a pH of about 10.5 with a total ammonia content corresponding to about 75 to 80 gpl $NH_3$.

TABLE 1

| Run | A | B | C |
|---|---|---|---|
| Aqueous phase: | | | |
| $WO_3$, gpl | 74.7 | 73.6 | 73.6 |
| Initial pH | 2.6 | 2.6 | 2.6 |
| Sodium, gpl | >35 | >35 | >35 |
| Sulfate, gpl | >50 | >50 | >50 |
| Organic phase: | | | |
| Ditridecylamine, vol. % | 6.5 | 7.2 | 7.7 |
| Isodecanol, vol. % | 12 | 12 | 12 |
| Diluent, vol. % (Escaid 200) | 81.5 | 80.8 | 80.3 |

TABLE 2

| | O/A | | | Raffinate pH | $WO_3$(gpl) | | | Strip Soln. | | |
|---|---|---|---|---|---|---|---|---|---|---|
| Run | Extr. | Wash | Strip | | Feed | Loaded Organic | Raffinate | $WO_3$ gpl | $SO_4$ gpl | Na ppm |
| A | 1.6 | 30.0 | 3.8 | 3.8 | 74.7 | 47.1 | 0.004 | 169 | 1.9 | 4.1 |
| B | 1.6 | 5.0 | 3.8 | 3.8 | 73.6 | 45.9 | 0.006 | 208 | 3.6 | 1.9 |
| C | 1.4 | 3.8 | 3.8 | 3.8 | 73.6 | 53.4 | 0.004 | 258 | 5.5 | 6.0 |

What is claimed is:

1. A process for extracting tungsten values from an aqueous phase into an organic phase, wherein a tungsten-depleted organic extractant is mixed with a tungsten-enriched aqueous phase to form a tungsten-organic complex in said extractant, comprising
   (a) providing an aqueous phase containing tungsten values dissolved therein, and having an initial pH of about 2.2 to about 4.0,
   (b) providing a water-immiscible organic phase selected from the group consisting of ditridecylamine dissolved in an aliphatic solvent, and water-insoluble secondary and tertiary amines dissolved in aromatic hydrocarbons, said organic phase also containing a modifier in an amount effective to increase the solubility of the tungsten-organic complex in said organic phase, and to increase the rate of separation of the organic-aqueous mixture,
   (c) contacting said aqueous phase with said organic phase in a plurality of extraction stages, including a final extraction stage, operating in countercurrent fashion to extract tungsten values from said organic phase into said aqueous phase, and
   (d) recovering from the final extraction stage the organic phase enriched in tungsten values and an aqueous raffinate having a pH of about 3.0 to about 4.5, wherein acid is added to the final extraction stage to maintain the pH of the aqueous raffinate at about 3.0 to about 4.5.

2. The process of claim 1 wherein said organic phase contains about 2 vol.% to about 20 vol.% of a secondary amine and about 2 vol.% to about 20 vol.% of nonanol or isodecanol.

3. The process of claim 1 or claim 2 wherein said aqueous raffinate has a pH of about 3.4 to about 4.2.

4. The process of claim 1 or claim 2 wherein the initial pH of said aqueous phase provided in step (a) is about 2.2 to about 3.0.

5. The process of claim 1 or claim 2 wherein tungsten values are extracted in step (c) in 2 to 6 extraction steps.

6. A process for extracting tungsten values from an aqueous phase into an organic phase, wherein a tungsten-depleted organic extractant is mixed with a tungsten-enriched aqueous phase to form a tungsten-organic complex in said extractant, comprising
   (a) providing an aqueous phase containing tungsten values dissolved therein, and having an initial pH of about 2.2 to about 3.0,
   (b) providing a water-immiscible organic phase comprising ditridecylamine dissolved in an aliphatic solvent, said organic phase also containing a modifier in an amount effective to increase the solubility of the tungsten-organic complex in said organic phase, and to increase the rate of separation of the organic-aqueous mixture,
   (c) contacting said aqueous phase with said organic phase in two to six extraction stages, including a final extraction stage, operating in countercurrent fashion to extract tungsten values from said organic phase into said aqueous phase, and
   (d) recovering from the final extraction stage the organic phase enriched in tungsten values and an aqueous raffinate having a pH of about 3.4 to about 4.2, wherein sulfuric acid is added to the final extraction stage to maintain the pH of the aqueous raffinate at about 3.4 to about 4.2.

7. The process of claim 1, claim 2 or claim 6 wherein at least about 99.9% of the tungsten values in said aqueous phase provided in step (a) are extracted into said organic phase enriched in tungsten values.

8. The process of claim 1, claim 2 or claim 6 wherein said organic phase enriched in tungsten values contains at least about 40 gpl tungsten as $WO_3$.

9. The process of claim 8 wherein said organic phase enriched in tungsten values contains at least about 75 gpl tungsten as $WO_3$.

10. The process of claim 9 wherein said organic phase enriched in tungsten values contains at least about 100 gpl tungsten as $WO_3$.

11. The process as described in claim 6 wherein the modifier is a long-chain alcohol having 6 to 15 carbon atoms.

12. The process of claim 6 wherein said organic phase contains about 2 volume % to about 20 volume % of nonanol or isodecanol.

* * * * *